(12) United States Patent
Smith et al.

(10) Patent No.: US 9,113,599 B2
(45) Date of Patent: Aug. 25, 2015

(54) FLUID CIRCUIT FOR BALE EJECTION WITH RESTRICTED FLOW

(71) Applicant: CNH America LLC, New Holland, PA (US)

(72) Inventors: Kevin M. Smith, Narvon, PA (US); Luke J. Harris, Leola, PA (US)

(73) Assignee: CNH Industrial America LLC, New Holland, PA (US)

( * ) Notice: Subject to any disclaimer, the term of this patent is extended or adjusted under 35 U.S.C. 154(b) by 35 days.

(21) Appl. No.: 14/089,512

(22) Filed: Nov. 25, 2013

(65) Prior Publication Data

US 2015/0143791 A1 May 28, 2015

(51) Int. Cl.
| | |
|---|---|
| *A01F 15/07* | (2006.01) |
| *A01F 15/08* | (2006.01) |
| *E05F 15/50* | (2015.01) |
| *E05F 3/04* | (2006.01) |

(52) U.S. Cl.
CPC .............. *A01F 15/0883* (2013.01); *A01F 15/07* (2013.01); *E05F 3/04* (2013.01); *E05F 15/50* (2015.01)

(58) Field of Classification Search
CPC ............... A01F 15/0883; A01F 15/07; A01F 2015/078; A01F 2015/0795; E05F 15/50; E05F 3/04
USPC .................. 100/5, 43, 76, 87, 88, 89, 269.01, 100/269.05; 56/341
See application file for complete search history.

(56) References Cited

U.S. PATENT DOCUMENTS

| | | | | |
|---|---|---|---|---|
| 4,072,096 | A | * | 2/1978 | Phillips ........................... 100/88 |
| 4,483,247 | A | * | 11/1984 | Coeffic ........................... 100/88 |
| 5,263,410 | A | * | 11/1993 | Olin ................................ 100/88 |
| 5,622,104 | A | | 4/1997 | Viesselmann et al. |
| 6,272,825 | B1 | * | 8/2001 | Anderson et al. ............... 56/341 |
| 6,892,632 | B1 | * | 5/2005 | Viesselmann et al. .......... 100/99 |
| 7,472,649 | B1 | | 1/2009 | Derscheid et al. |
| 7,805,914 | B2 | | 10/2010 | Smith |
| 7,849,791 | B2 | | 12/2010 | Smith |
| 2005/0257513 | A1 | * | 11/2005 | Smith et al. ..................... 56/341 |

FOREIGN PATENT DOCUMENTS

| | | |
|---|---|---|
| EP | 0479190 | 9/1991 |
| EP | 1444882 A2 | 8/2004 |

* cited by examiner

*Primary Examiner* — Jimmy T Nguyen
(74) *Attorney, Agent, or Firm* — Patrick M. Sheldrake; Seyed V. Sharifi T.

(57) ABSTRACT

A hydraulic circuit mechanically link to a tailgate of an agriculture harvester. The hydraulic circuit of the present invention can be used to facilitate the transition of hydraulic states from a quick speed to a slow speed, when opening and closing the tailgate. The hydraulic circuit includes a fluid stop valve having a restrictive orifice which, when narrowed, reduces the rate of pressurized fluid flow into a hydraulic actuator during the actuator's extension. The reduced flow of pressurized fluid into the hydraulic cylinder substantially reduces the speed at which the panel opens or closes.

18 Claims, 10 Drawing Sheets

FLUID CIRCUIT FOR BALE EJECTION WITH RESTRICTED FLOW

TECHNOLOGY FIELD

The present invention relates generally to agricultural harvesters such as package crop balers, and, more particularly, to an improved system and method of raising and closing a tailgate of a baling mechanism.

BACKGROUND

For many years agricultural balers have been used to consolidate and package crop material so as to facilitate the storage and handling of the crop material for later use. Usually, a mower-conditioner cuts and conditions the crop material for windrow drying in the sun. When the cut crop material is properly dried, a round baler is pulled along the windrows to pick up the crop material and form it into cylindrically shaped round bales. More specifically, the pickup of the baler gathers the cut and windrowed crop material from the ground and then conveys the cut crop material with a conveyor, such as a rotating conveying rotor, into a bale-forming chamber within the baler. The pickup assembly has a drive mechanism that operates to activate both the pickup and the conveying rotor, and the pickup drive mechanism is operably connected to and driven by the main drive mechanism of the baler. The baling chamber consists of a pair of opposing sidewalls with a series of belts that rotate and compress the crop material into a cylindrical shape. When the bale has achieved a desired size and density, the round baler wraps the bale with twine or other wrapping material, such as film or net, to ensure that the bale maintains its shape and density. Then the operator raises the tailgate of the baler and ejects the bale onto the ground. The tailgate is then closed and the cycle repeated as necessary and desired to manage the field of cut crop material.

The rotor conveyor mechanism ("rotor" or "rotor mechanism") between the pickup and the bale-forming chamber is usually referred to as the "stuffer", because it stuffs the crop material into the gap between the floor roll and the starter roll into the bale-forming chamber.

Opening and closing of the tailgate has been controlled by a flow valve, which was located between a source of pressurized hydraulic fluid and an actuator. The position of the flow valve was controlled by a hydraulic lever. To increase efficiency, the rate of opening and closing of the tailgate should be rapid. However, such rapid movement of the tailgate can lead to damage to the baler. Therefore, to slow the rate of opening and closing near the end of the opening or closing portion of the cycle, hydraulic valve have been "feathered" by positioning the hydraulic lever between its fully open position and its fully closed position. This solution depends on the skill of the operator and requires the attention of the operator.

Exemplary prior art tailgate opening and closing mechanisms, which do not vary the speed of opening or closing, are shown in Viesselmann et al. U.S. Pat. No. 5,622,104 and Anderson U.S. Pat. No. 6,272,825. Biziorek et al. U.S. Patent Application Publication No. 2005/0247215 discloses a round baler that varies the speed of the opening and closing of the tailgate using tailgate position sensors.

In order to prevent rapid decelerations of the tailgate when it meets its closing stops, the Viesselmann system includes an orifice that continuously slows the flow of oil to and from the tailgate hydraulic actuators to effectively cushion the closing of the tailgate. The flow restriction valve assembly of Anderson is either open or closed and prevents the tailgate from slamming shut. The result is that the tailgate motion is slowed and the open and close cycle time of the tailgate is increased, making the baling operation less efficient.

To improve efficiency, it is desirable to restrict flow of the fluid to the actuator only near the end of the opening and closing cycles. While the flow of hydraulic fluid to the tailgate actuator of Biziorek is regulated by valve device, the control system of Biziorek requires a number of positional sensors to determine the position of the tailgate. The addition of the positional sensors increases the cost of the baler due to increased installation cost, as well as the addition of components that are subject to failure. Additionally, an important functional limitation of Biziorek is the valve in the fluid circuit that forcibly causes the hydraulic system to change speed when either in a closed or open state.

The embodiments provided herein provide for an improved baler by providing faster and smoother tailgate operation and providing less stress on the tailgate that is involved in ejecting the bale with efficient operation and advantages over prior controllers of tailgate operation. Rather than forcibly causing the tailgate to close by opening and shutting of a single valve, some embodiments accomplish a smoother opening and closing function of the tailgate by utilization of a valve with an electronically controlled orifice. When activated, the electronically controlled orifice becomes more narrow thereby changing the fluid dynamics of a hydraulic system from full flow to restrictive flow. When the adjustable control valve is in one of its restrictive states the flow of the pressurized fluid in the line causes back pressure in the circuit. Float of the tailgate is accomplished when the tailgate approaches transitions from a first hydraulic state to a second hydraulic state, the second hydraulic state defined by activation of a single fluid valve with an electronically controlled orifice that narrows either continuously to a desired pressurized fluid flow rate or abruptly to a desired pressurized fluid flow rate. The float of the tailgate is achieved at or near the end of each stroke of the tailgate—either when the tailgate approaches or is at its desired distance from its fully closed position, or when the tailgate closes at or near its fully closed position.

SUMMARY

Embodiments of the present invention address and overcome one or more of the above shortcomings and drawbacks, by providing agricultural harvesters, including balers and combines that comprise the disclosed hydraulic circuit so that crop material is more efficiently transported and ejected from the harvester. This technology is particularly well-suited for, but by no means limited to, round balers, cotton harvesters, and/or combines comprising a baling mechanism. In some embodiments, the harvester or hydraulic system disclosed herein comprises a hydraulic circuit that transitions from a first state to a second state, from a second to a third, or a third to a fourth hydraulic state.

The invention relates to an agricultural harvester comprising:
a baling chamber comprising a bale outlet and a tailgate at a rear section of the baling chamber, the tailgate movable between a closed and one or more open positions and obstructing the bale outlet in its closed position; at least one actuator mechanically linked to the tailgate, the at least one actuator capable of moving the tailgate between the closed and one or more open positions and having at least a first fluid opening on one end of the actuator, wherein the first fluid opening feeds and/or returns pressurized fluid into a hydraulic circuit, the hydraulic circuit comprising: a source of pressurized fluid in fluid communication with at least the first opening for supplying fluid to and returning fluid from the actuator in the hydraulic circuit; at least one fluid stop valve in fluid communication with the hydraulic circuit; and at least one fluid controller that controls the flow of pressurized fluid through the fluid stop valve from the source of pressurized fluid or from the at least one actuator; wherein the tailgate moves from a closed position to one or more open positions in a first and a second hydraulic state; whereby, in the first hydraulic state, the stop valve is open allowing pressurized fluid from the source of pressurized fluid to enter the first fluid opening; and, whereby, in the second hydraulic state, a restrictive orifice in the fluid stop valve is at least partially narrowed or closed thereby reducing the rate of flow of pressurized fluid from the source of the pressurized fluid through the at least one fluid stop valve and substantially reducing and/or stopping movement of the at least one actuator.

In some embodiments, the agricultural harvester of claim 1, wherein the at least one actuator comprises: a first fluid opening on one end of the actuator, a second fluid opening on the opposite end of the actuator, wherein the first and second fluid openings feed and/or return pressurized fluid into a hydraulic circuit; the hydraulic circuit comprising: a source of pressurized fluid in fluid communication with the first and second openings for supplying fluid to and returning fluid from the actuator in the hydraulic circuit; at least one fluid stop valve in fluid communication with the hydraulic circuit; and at least one fluid controller that controls the flow of pressurized fluid through the fluid stop valve from the source of pressurized fluid or from the at least one actuator;

wherein the tailgate moves from a closed position to one or more open positions in a first and a second hydraulic state; whereby, in the first hydraulic state, the stop valve is open allowing pressurized fluid from the source of pressurized fluid to enter the first fluid opening; and, simultaneously, pressurized fluid returns from the at least one actuator through the second fluid opening to the source of the pressurized fluid; and whereby, in the second hydraulic state, a restrictive orifice in the fluid stop valve is at least partially narrowed or closed thereby reducing the rate of flow of pressurized fluid from the source of the pressurized fluid through the at least one fluid stop valve and substantially reducing and/or stopping movement of the at least one actuator. In some embodiments the at least one actuator further comprises a first switch and a second switch, the first switch and second switch each having a first state and a second state and being in operable connection to the fluid controller, wherein the tailgate moves from the first to the second hydraulic state upon activation of the first switch from its first to second state.

In some embodiments, the agricultural harvester further comprises a controller that measures a time period for the first switch change from a first state to a second state and a time period for the second tailgate switch to change from a first state to a second state, wherein the time period for the first tailgate switch to change from a first state to a second state is dependent upon at least one or a combination of: (i) a diameter or density of a bale growing in the bale chamber; (ii) a presence or absence of a bale in the bale chamber; (iii) a predetermined position of the tailgate relative to its closed position; (iv) a predetermined position of a serpentine arm mechanically linked to the agricultural harvester and capable of upward movement upon initiating ejection of the bale from the bale chamber; and (v) a predetermined position of a bale ramp mechanically linked to the agricultural harvester and capable of supporting a bale ejected from the bale chamber. In some embodiments, the at least one fluid controller is programmed to adjust the rate of flow of the pressurized fluid through the fluid stop valve by adjusting the position of a restrictive orifice, and wherein the time period for the first tailgate switch to change from a first state to a second state is dependent upon at least a predetermined position of the tailgate. In some embodiments, the at least one fluid controller is a solenoid programmed to be energized and at least partially close the restrictive orifice in the fluid stop valve relative to its position in the first hydraulic state thereby reducing the rate of flow of the pressurized fluid to the at least one actuator.

In some embodiments, the at least one fluid controller is a solenoid programmed to be energized and at least partially close the restrictive orifice in the fluid stop valve relative to its position in the first hydraulic state thereby reducing the rate of flow of the pressurized fluid to the at least one actuator, wherein the solenoid is energized at least partially based upon the predetermined position of the bale ramp. In some embodiments, the at least one fluid controller is a solenoid programmed to be energized and at least partially close the restrictive orifice in the fluid stop valve relative to its position in the first hydraulic state thereby reducing the rate of flow of the pressurized fluid to the at least one actuator, wherein the solenoid is energized at least partially based upon at least a predetermined position of the tailgate.

In some embodiments, the invention relates to the agricultural harvester described herein, wherein the at least one fluid controller is a solenoid programmed to be energized and at least partially close the restrictive orifice in the fluid stop valve relative to its position in the first hydraulic state thereby reducing the rate of flow of the pressurized fluid to the at least one actuator, wherein the solenoid is energized at least partially based upon a predetermined position of a serpentine arm mechanically linked to the agricultural harvester.

In some embodiments, the invention relates to an agricultural harvester described herein in which the at least on actuator comprises a first and second fluid opening, wherein the tailgate moves from an opened position to a closed position in a third and a fourth hydraulic state; whereby, in the third hydraulic state, the flow of the pressurized fluid is reversed in the hydraulic circuit such that fluid from the source of pressurized fluid flows directly to the second fluid opening of the at least one actuator, and, simultaneously, pressurized fluid returns from the at least one actuator through the first fluid opening and through the open stop valve allowing free flow of pressurized fluid from the at least one actuator to the source of the pressurized fluid; and whereby, in the fourth hydraulic state, the fluid stop valve is narrowed either instantaneously or gradually, thereby reducing the flow of pressurized fluid from the at least one fluid stop valve into the source of pressurized fluid relative to flow of the pressurized fluid in the third hydraulic state and thereby substantially slowing and/or stopping the movement of the tailgate as it approaches its closed position.

In some embodiments, the agricultural harvester or the hydraulic circuit comprises a single fluid stop valve. In some embodiments, the agricultural harvester comprises the at least one actuator mechanically linked to the a tailgate of a baling mechanism or ejection mechanism wherein the tailgate moves from the third to the fourth hydraulic state based upon one or a combination of: (i) activation of the second switch from its first to second state; or (ii) one or more movements and/or one or more positions of one or more serpentine arms in one or more baling mechanisms.

In some embodiments, the agricultural harvester of claim 1, further comprising at least one activation device in operable connection to the fluid controller and manually activatable to commence movement of the tailgate from the one or more open positions and/or from the closed position.

In some embodiments, in the agricultural harvester or system disclosed herein, the at least one fluid controller is a solenoid. In some embodiments, in the agricultural harvester or system disclosed herein, the at least one fluid controller is a mechanical controller. In some embodiments, the agricultural harvester or system comprises a solenoid, wherein the solenoid is programmed to be energized based upon the activation of one or a combination of: (i) the first switch from its first to second state; or (ii) the second switch from its first to second state. In some embodiments, the agricultural harvester or system further comprises a controller that measures a time period for the second switch change from a first state to a second state and a time period for the second tailgate switch to change from a first state to a second state, wherein the time period for the second tailgate switch to change from a first state to a second state is dependent upon at least one or a combination of: (i) a diameter or density of a bale growing in the bale chamber; (ii) a presence or absence of a bale in the bale chamber; (iii) a predetermined position of the tailgate relative to its open position; (iv) a predetermined position of a serpentine arm mechanically linked to the agricultural harvester and capable of upward movement upon initiating ejection of the bale from the bale chamber; and (v) a predetermined position of a bale ramp mechanically linked to the agricultural harvester and capable of supporting a bale ejected from the bale chamber.

In some embodiments, the agricultural harvester is chosen from a round baler cotton harvester, or combine comprising a baling mechanism. In some embodiments, the system, ejection mechanism or tailgate mechanism is configured for an agricultural harvester.

The invention further relates to a system for operation of a panel on an agricultural harvester comprising, an outlet and a panel, the panel movable between a closed and one or more open positions and obstructing the bale outlet in its closed position; at least one actuator mechanically linked to the panel, the at least one actuator capable of moving the panel between the closed and one or more open positions and having at least a first fluid opening on one end of the actuator, wherein the first fluid opening feeds and returns pressurized fluid into a hydraulic circuit; the hydraulic circuit comprising a source of pressurized fluid in fluid communication with the first and second openings for supplying fluid to and returning fluid from the at least one actuator in the hydraulic circuit operable in at least first and second hydraulic state; at least one fluid stop valve in fluid communication with the source of pressurized fluid and the at least one actuator, the fluid stop valve comprising at least one restrictive orifice; and at least one fluid controller that controls the flow of pressurized fluid through the at least one fluid stop valve; wherein the system operates in at least a first and second hydraulic state; whereby, in the first hydraulic state, the at least one fluid stop valve is in an open configuration and pressurized fluid from the source of the pressurized fluid flows to the first fluid opening of the at least one actuator through the at least one fluid stop valve; whereby, in the second hydraulic state, the restrictive orifice of the fluid stop valve is partially closed or closed as compared to the position of the fluid orifice in the first hydraulic state, thereby reducing the rate of flow of pressurized fluid from entering the first fluid opening of the at least one actuator and substantially reducing the rate of and/or stopping movement of the at least one actuator. In some embodiments, the at least one actuator the at least one actuator comprises a first fluid opening on one end of the actuator, a second fluid opening on the opposite end of the actuator, wherein the first and second fluid openings feed and return pressurized fluid into a hydraulic circuit; the hydraulic circuit comprising a source of pressurized fluid in fluid communication with the first and second openings for supplying fluid to and returning fluid from the at least one actuator in the hydraulic circuit; at least one fluid stop valve in fluid communication with the source of pressurized fluid and the at least one actuator, the fluid stop valve comprising at least one restrictive orifice; and at least one fluid controller that controls the flow of pressurized fluid through the at least one fluid stop valve; the system operating in a first and second hydraulic state, whereby, in the first hydraulic state, the at least one fluid stop valve is in an open configuration and pressurized fluid from the source of the pressurized fluid flows to the first fluid opening of the at least one actuator through the at least one fluid stop valve, and, simultaneously, pressurized fluid from the at least one actuator returns to the source of the pressurized fluid through the second fluid opening; whereby, in the second hydraulic state, the restrictive orifice of the fluid stop valve is partially closed or closed as compared to the position of the fluid orifice in the first hydraulic state, thereby reducing the rate of flow of pressurized fluid from entering the first fluid opening of the at least one actuator and substantially reducing the rate of and/or stopping movement of the at least one actuator.

In some embodiments, the hydraulic circuit further operates in a third hydraulic state and a fourth hydraulic state, whereby in the third hydraulic state pressurized fluid from the source of pressurized fluid flows to the second fluid opening of the at least one actuator, and, simultaneously, pressurized fluid returns from the at least one actuator through the first fluid opening and through the at least one fluid stop valve configured in an open position and allowing flow of pressurized fluid from the at least one actuator to the source of the pressurized fluid; and in a fourth hydraulic state, the restrictive orifice of the fluid stop valve is partially closed or closed as compared to its open configuration in the third hydraulic state, thereby substantially reducing the rate of flow of pressurized fluid in the hydraulic circuit and/or substantially reducing the rate of or stopping the movement of the tailgate as it moves from an open position to one or more closed position.

In some embodiments, the invention relates to a hydraulic circuit comprising:

at least one actuator mechanically linked to a panel, the at least one actuator capable of moving the panel between a closed and one or more open positions and comprising
  a first fluid opening on one end of the actuator,
  a second fluid opening on the opposite end of the actuator,
    wherein the first and second fluid openings feed and return pressurized fluid into the hydraulic circuit;
  a source of pressurized fluid in fluid communication with the first and second fluid openings for supplying fluid to the at least one actuator in the hydraulic circuit;
  at least one fluid stop valve in fluid communication with the source of pressurized fluid and the at least one actuator, the stop valve comprising at least one restrictive orifice;
  at least one fluid controller that controls the flow of pressurized fluid through the fluid stop valve from the source of pressurized fluid or from the at least one actuator; wherein the system is configured to operate in a first, second, third, and fourth hydraulic state, whereby in a first hydraulic state, operable when the at least one fluid stop valve is in one or more open positions, in which pressurized fluid from the source of the pressurized fluid flows to the first fluid opening of the at least one actuator through the open fluid stop valve, and, simultaneously, pressurized fluid from the at least one actuator returns to the source of the pressurized fluid through the second fluid opening without passing through the at least one fluid stop valve;

in a second hydraulic state, operable when the at least one fluid stop valve is closed or at least partially closed as compared to its open configuration in the first hydraulic path, whereby the restrictive orifice of the fluid stop valve is narrowed, thereby reducing the rate of flow of pressurized fluid from the at least one fluid stop valve and entering the first fluid opening of the at least one actuator and substantially reducing the rate of and/or stopping movement of the actuator;

in a third hydraulic state, operable when the fluid stop valve is in one or more open positions, in which pressurized fluid from the source of pressurized fluid flows to the second fluid opening of the at least one actuator, and, simultaneously, pressurized fluid returns from the at least one actuator through the first fluid opening and through the open stop valve allowing free flow of pressurized fluid from the at least one actuator to the source of the pressurized fluid; and in a fourth hydraulic path, whereby the restrictive orifice of the fluid stop valve is closed or partially closed, thereby substantially slowing the rate of the flow of the pressurized fluid from the at least one fluid stop valves and/or stopping the movement of the panel as it moves from an open position to one or more closed position; and at least one fluid source controller that controls the direction of pressurized fluid flow in the hydraulic circuit such that pressurized fluid may flow from the source of the pressurized fluid toward the first fluid opening when opening the panel in the first or second hydraulic paths or from the source of the pressurized fluid toward the second fluid opening when closing the panel in the third or fourth hydraulic paths.

In some embodiments, the at least one actuator further comprises a first switch and a second switch, the first switch and second switch each having a first state and a second state and being in operable connection to the fluid controller, wherein the panel moves from a first hydraulic state to a second hydraulic state upon activation of the first switch from its first to its second state. In some embodiments, the hydraulic circuit further comprising a controller that measures a time period for the first switch change from a first state to a second state and a time period for the second switch to change from a first state to a second state, wherein the time period for the first switch to change from a first state to a second state is dependent upon at least one or a combination of: (i) a diameter or density of a bale growing in a bale chamber; (ii) a presence or absence of a bale in a bale chamber; (iii) a predetermined position of the panel relative to its closed position; (iv) a predetermined position of a serpentine arm mechanically linked to an agricultural harvester comprising the hydraulic circuit and capable of upward movement upon initiating ejection of a bale from a bale chamber in the agricultural harvester; and (v) a predetermined position of a bale ramp mechanically linked to the agricultural harvester and capable of supporting the bale ejected from the bale chamber.

In some embodiments, the controller that measures a time period for the first switch change from a first state to a second state and/or a time period for the second switch to change from a first state to a second state is a potentiometer.

The invention also relates to a method of extending or contracting an actuator mechanically linked to a panel, the method comprising using the hydraulic system, wherein, using the hydraulic system comprises:

directing the flow of pressurized fluid into the first hydraulic state and then subsequently into the second hydraulic state if to extend the actuator; and/or directing the flow of pressurized fluid into the third hydraulic state and then subsequently into a fourth hydraulic state if to contract the actuator.

The invention further relates to a system for operation of a panel on an agricultural harvester comprising, an outlet and a panel, the panel movable between a closed and one or more open positions and obstructing the outlet in its closed position; at least one actuator mechanically linked to the panel, the at least one actuator capable of moving the panel between the closed and one or more open positions and having a first fluid opening on one end of the actuator, a second fluid opening on the opposite end of the actuator, wherein the first and second fluid openings feed and return pressurized fluid into a hydraulic circuit; the hydraulic circuit comprising a source of pressurized fluid in fluid communication with the first and second openings for supplying fluid to and returning fluid from the at least one actuator in the hydraulic circuit; at least one fluid stop valve in fluid communication with the source of pressurized fluid and the at least one actuator, the fluid stop valve comprising at least one restrictive orifice; and at least one fluid controller that controls the flow of pressurized fluid through the at least one fluid stop valve; wherein the at least one restrictive orifice is adjustable based upon one or more predetermined positions of one or more serpentine arms of a baling mechanism.

The invention also relates to a method of extending or contracting an actuator mechanically linked to a panel, the method comprising using the hydraulic system disclosed herein, wherein, using the hydraulic system comprises: directing the flow of pressurized fluid into the first hydraulic path and then subsequently into the second hydraulic path if to extend the actuator; and/or directing the flow of pressurized fluid into the third hydraulic path and then subsequently into the fourth hydraulic path if to contract the actuator.

Additional features and advantages of the invention will be made apparent from the following detailed description of illustrative embodiments that proceeds with reference to the accompanying drawings.

BRIEF DESCRIPTION OF THE DRAWINGS

The foregoing and other aspects of the present invention are best understood from the following detailed description when read in connection with the accompanying drawings. For the purpose of illustrating the invention, it being understood, however, that the invention is not limited to the specific instrumentalities disclosed. Included in the drawings are the following.

DETAILED DESCRIPTION OF ILLUSTRATIVE EMBODIMENTS

Figure 1:
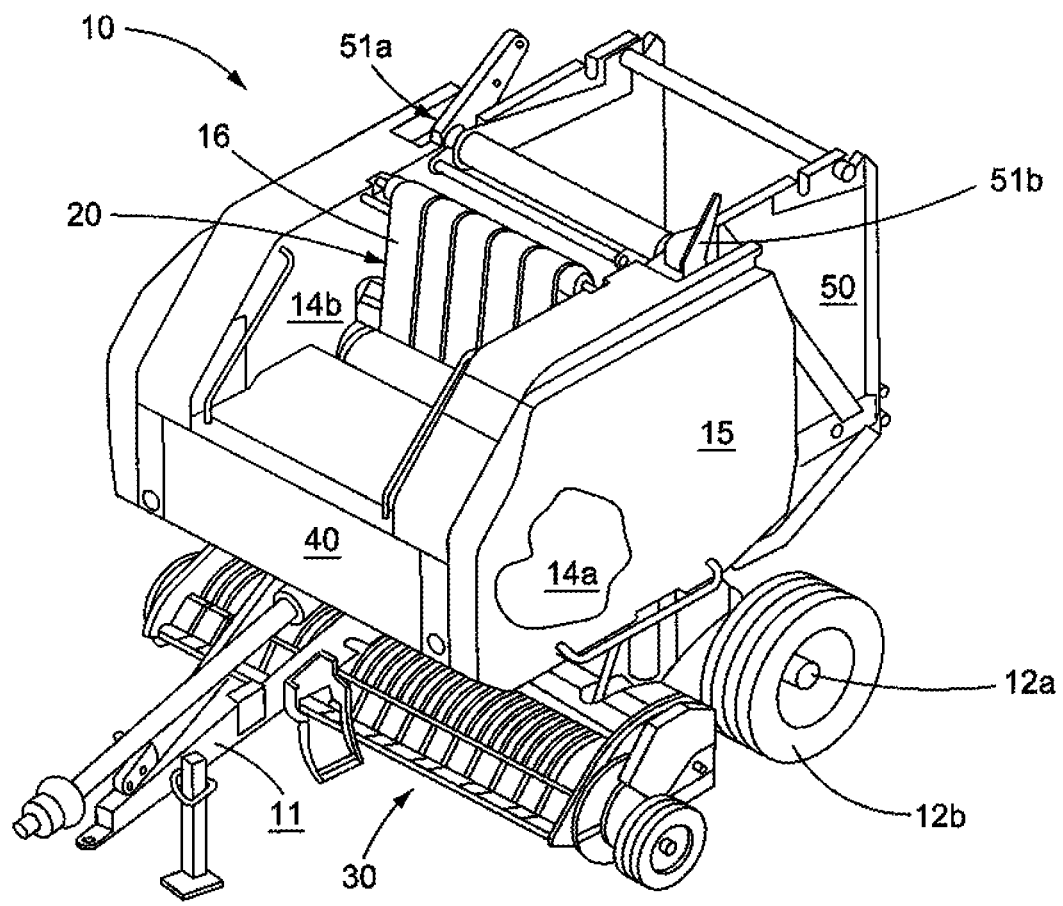
FIG. 1 is a side perspective view of a round baler of the type in which the bale ejection system of the present invention may be integrated.

Many of the fastening, connection, processes and other means and components utilized in the embodiments described herein are widely known and used in the field of the invention described, and their exact nature or type is not necessary for an understanding and use of the invention by a person skilled in the art, and they will not therefore be discussed in significant detail. Furthermore, the various components shown or described herein for any specific application of this invention can be varied or altered as anticipated by this invention and the practice of a specific application of any element may already be widely known or used in the art by persons skilled in the art and each will likewise not therefore be discussed in significant detail.

As used herein the term "panel" means any movable surface or movable component that obstructs a conduit or an inlet or outlet of a device. In some embodiments, the movable surface is operably linked to a hinge or other means to facilitate an opening motion of the movable surface in response to a signal sent by an operator of the device, such pivoting motion causing exposure of the inlet or outlet or conduit for use. In some embodiments, the device is a baling mechanism or agricultural harvester comprising a baling mechanism. In some embodiments, the device is a component of agricultural equipment and the movable surface is chosen from a door, panel, gate, or tailgate. In some embodiments, the term panel is used to describe a tailgate of a baling mechanism, said tailgate mechanism in operable communication with an actuator or tensioning actuator or tensioning arm.

Agricultural balers, such as round balers, are well known in the agricultural industry, and the instant invention can be used with substantially any of such machines. Reference is made, for example, to U.S. Pat. Nos. 6,877,304; 6,688,092; 6,644,006 and 6,295,797 that illustrate such balers, the disclosures of which are incorporated herein by reference in their entireties. Embodiments of the present invention are particularly well suited, but in no way limited to, use with agricultural balers. The present invention may also find utility in agricultural harvesters including, for example, a waste baler, a cotton harvester fitted with a baling mechanism, or a combine fitted with a baling mechanism.

The invention relates generally to a baling system comprising a hydraulic circuit that comprises a tensioning actuator in fluid connection to at least two fluid paths and a source of pressurized fluid. Pressurized fluid, such as oil, controls the extension and contraction of a rod and disc in the actuator. In some embodiments, an actuator comprises a first fluid and second fluid opening. In some embodiments, the first fluid opening is on the disc end of the hydraulic actuator and the second fluid opening is on the opposite, or rod-end of the hydraulic cylinder end, of the actuator. Pressurized fluid enters the tensioning actuator at the first fluid or second fluid opening thereby pushing the disc and rod up or down depending upon the direction of flow of the pressurized fluid. The movement of the rod and disc also displaces the volume of pressurized fluid contained within the actuator on the side of the actuator opposite to the side through which the pressurized fluid enters. If the first fluid opening serves as the pressurized fluid inlet or feed, the second fluid opening serves as the pressurized fluid outlet, or return. If an operator switches the direction of flow of the pressurized fluid, the second fluid opening becomes the feed and the first fluid opening becomes the return.

In some embodiments, the invention relates to an agricultural harvester, wherein the at least one actuator comprises: a first fluid opening on one end of the actuator, a second fluid opening on the opposite end of the actuator, wherein the first and second fluid openings feed and/or return pressurized fluid into a hydraulic circuit; the hydraulic circuit comprising: a source of pressurized fluid in fluid communication with the first and second openings for supplying fluid to and returning fluid from the actuator in the hydraulic circuit; at least one fluid stop valve in fluid communication with the hydraulic circuit; and at least one fluid controller that controls the flow of pressurized fluid through the fluid stop valve from the source of pressurized fluid or from the at least one actuator; wherein the tailgate moves from a closed position to one or more open positions in a first and a second hydraulic state, wherein the tailgate moves from an opened position to a closed position in a third and a fourth hydraulic state; whereby, in the third hydraulic state, the flow of the pressurized fluid flows in the hydraulic circuit from the source of pressurized fluid flows directly to the second fluid opening of the at least one actuator, and, simultaneously, pressurized fluid returns to the source of the pressurized fluid from the at least one actuator through the first fluid opening and through the open stop valve allowing free flow of pressurized fluid from the at least one actuator to the source of the pressurized fluid; and whereby, in the fourth hydraulic state, the fluid stop valve is narrowed either instantaneously or gradually, thereby reducing the flow of pressurized fluid from the at least one fluid stop valve into the source of pressurized fluid relative to flow of the pressurized fluid in the third hydraulic state and thereby substantially slowing and/or stopping the movement of the tailgate as it approaches its closed position.

Pressurized fluid is supplied to the actuator by the source of the pressurized fluid, which, in some embodiments, may be an oil depot on a tractor or on an agricultural harvester or agricultural vehicle that pulls a baling mechanism. The operator of the tractor or other vehicle pulling the agricultural harvester (or, in some embodiments, the operator of the agricultural harvester itself) can determine when to switch the direction of the pressurized fluid in the hydraulic circuit by either manually activating a controller in operable communication with the source of the pressurized fluid or programming a processor in operable communication with a controller that directs the flow of the pressurized fluid at or during a predetermined time period or a predetermined time interval. In some embodiments, there may be at least one or more sources of pressurized fluid but, in any such embodiment, the at least one or more sources of pressurized fluid is capable of feeding a hydraulic line that carries pressurized fluid to the first and second fluid opening of the at least one actuator. Hydraulic lines that serve as conduits for the pressurized fluid from the source of the pressurized fluid to the first and second fluid opening of the at least one actuator form a hydraulic circuit in which the pressurized fluid is circulating from the source of the pressurized fluid to the at least one actuator or, in some embodiments, from the source of the pressurized fluid to a fluid stop valve operably coupled to at least one fluid controller, the at least one fluid controller capable of opening and closing the fluid stop valve when the fluid controller becomes activated. In some embodiments, the hydraulic lines carry pressurized fluid from the at least one actuator or the fluid stop valve back to the source of the pressurized fluid. In some embodiments, one of more of the hydraulic lines carry pressurized fluid to one or more check valves or restrictive orifices.

In some embodiments, the system or agricultural harvester or hydraulic circuit comprises a panel operably connected to one or more hydraulic circuits. In some embodiments, the hydraulic circuit comprises at least four hydraulic states, each hydraulic state comprising at least a first hydraulic path through which the pressurized fluid preferably flows. The operator may manually manipulate a controller to open or close valves in the hydraulic circuit thereby redirecting the rate and/or direction of flow of the pressurized fluid from one hydraulic path to another hydraulic path. In some embodiments, the operator may manipulate a controller to reverse the direction of flow in the hydraulic circuit. In some embodiments, the operator may program a processor operably connected to the controller to open or close valves in the hydraulic circuit thereby redirecting the pressurized fluid from one hydraulic path to another hydraulic path and/or reverse the flow of the pressurized fluid in the hydraulic circuit.

In some embodiments, the fluid controller is a solenoid or mechanical switch. In some embodiments, the fluid controller is a solenoid operably coupled to a processor and at least a first and second switch, the processor capable of being programmed by the operator of the agricultural harvester prior to or during operation of the agricultural harvester. In such instances, the operator may program a desired distance that the panel or tailgate travel before the solenoid or mechanical switch become activated by the processor. The processor comprises a storage memory for the programmable parameters related to when an operator may initiate a command to transition from one hydraulic state to another hydraulic state disclosed herein. In some embodiment, the operator may program any one of the following conditions which independently or in combination determine when the solenoid or mechanical switch become activated to transition any of the disclosed baling mechanisms, systems, agricultural harvesters, and/or hydraulic circuits from their first to their second hydraulic states, and/or from their second to their third hydraulic states, and or from the third to their fourth hydraulic states, and/or from their fourth to their fourth to their first hydraulic states: (i) a diameter or density of a bale growing in the bale chamber; (ii) a presence or absence of a bale in the bale chamber; (iii) a predetermined position of the tailgate relative to its closed position; (iv) a predetermined position of a serpentine arm mechanically linked to the agricultural harvester and capable of upward movement upon initiating ejection of the bale from the bale chamber; and (v) a predetermined position of a bale ramp mechanically linked to the agricultural harvester and capable of supporting a bale ejected from the bale chamber. In some embodiments, wherein the hydraulic circuit further comprises a first switch and a second switch, the first switch and second switch each having a first state and a second state and being in operable connection to the fluid controller wherein the tailgate moves from the first to the second hydraulic state upon activation of the first switch from its first to second state. In some embodiments, any hydraulic circuit disclosed herein or the agricultural harvester comprising the hydraulic circuit disclosed herein further comprises a controller that measures a time period for the first switch change from a first state to a second state and a time period for the second switch to change from a first state to a second state, wherein the time period for the first switch to change from a first state to a second state is dependent upon at least one or a combination of: (i) a diameter or density of a bale growing in the bale chamber; (ii) a presence or absence of a bale in the bale chamber; (iii) a predetermined position of the tailgate relative to its closed position; (iv) a predetermined position of a serpentine arm mechanically linked to the agricultural harvester and capable of upward movement upon initiating ejection of the bale from the bale chamber; and (v) a predetermined position of a bale ramp mechanically linked to the agricultural harvester and capable of supporting a bale ejected from the bale chamber. In some embodiments, the time period for the first switch to change from a first state to a second state is dependent upon at least a diameter or density of a bale growing in the bale chamber. In some embodiments, the time period for the first switch to change from a first state to a second state is dependent upon at least a presence or absence of a bale in the bale chamber. In some embodiments, the time period for the first switch to change from a first state to a second state is dependent upon at least a predetermined position of a tailgate relative to its closed position. In some embodiments, the time period for the first switch to change from a first state to a second state is dependent upon at least a predetermined position of a serpentine arm mechanically linked to the agricultural harvester and capable of upward movement upon either (i) initiating ejection of the bale from the bale chamber; and/or (ii) growth of the bale in the bale chamber. In some embodiments, the time period for the first switch to change from a first state to a second state is dependent upon at least a predetermined position of a bale ramp mechanically linked to the agricultural harvester and capable of supporting a bale ejected from the bale chamber.

In some embodiments, the system or agricultural harvester or hydraulic circuit disclosed herein does not comprise one or more sensors that determine the position of a panel upon opening or closing of the tailgate for purposes of transitioning from a first to second hydraulic state. In some embodiments, the system or agricultural harvester or hydraulic circuit does not comprise one or more sensors that determine the position of the tailgate mechanism upon opening or closing of the panel for purposes of transitioning from a second to third hydraulic state. In some embodiments, the system or agricultural harvester or hydraulic circuit does not comprise one or more sensors that determine the position of the tailgate mechanism upon opening or closing of the panel for purposes of transitioning from a third to fourth hydraulic state. In some embodiments, the system or agricultural harvester or hydraulic circuit does not comprise one or more sensors that determine the position of the panel upon opening or closing of the tailgate for purposes of transitioning from a first to second hydraulic state, or from a second to third hydraulic state, or from a third to a fourth hydraulic state, or from a fourth to a first hydraulic state or a combination thereof. In some embodiments, the restrictive orifice of the stop valve is electronically narrowed or widened by a signal from one or more controllers operably connected to the stop valve.

Referring to FIG. 1, a generally well-known round baler 10 is shown to include a main frame terminating forwardly in a tongue 11 and rearward slightly beyond a transverse axle 12A to which a pair of wheels 12B (only one shown) is mounted—thus forming a wheel supported main frame (not shown in detail). The main frame supports a series of belts 16 and floor rolls (not shown), which together with a first sidewall 14a (shown in the breakout) behind and generally parallel to cover panel 15 and a second sidewall 14b, collectively forming a bale-forming chamber 20. Cut crop material is picked up by transverse pickup 30 and fed into bale-forming chamber 20 where it is formed into a cylindrically shaped ball (not shown) by a series of conveyer belts 16. The bale is then wrapped with twine or a wrapping material dispensed from a wrapping mechanism generally behind shield 40. Upon completion of the wrapping process, the tailgate 50 pivots upwardly about pivot points 51a, 51b and the bale is discharged onto the ground. In some embodiments, the panel is a tailgate 50. In some embodiments, the system, hydraulic circuit, or agricultural harvester comprises at least one or two tensioning actuators, each tensioning actuator being operably linked to the tailgate and in fluid communication with the same or similar parallel hydraulic paths. In some embodiments, the tailgate 50 and hydraulic mechanism that controls the upward swing of the tailgate is replaced by the bale carrier disclosed in U.S. patent application Ser. Nos. 13/308,304 and/or 13/784,133, each of which are incorporated by reference in their entireties. In some embodiments, the system, the agricultural harvester, the baling mechanism disclosed herein comprises two hydraulic tensioning actuators positioned on opposite sides of the sidewalls of an agricultural harvester.

Embodiments of the present invention are generally described in FIGS. 2-5. The hydraulic circuit disclosed can be used in conjunction with the tailgate of a baler, whereby the hydraulic cylinder or actuator 110 is mechanically linked to the sidewall of an agricultural harvester and the tailgate of the agricultural harvester.

Figure 2:
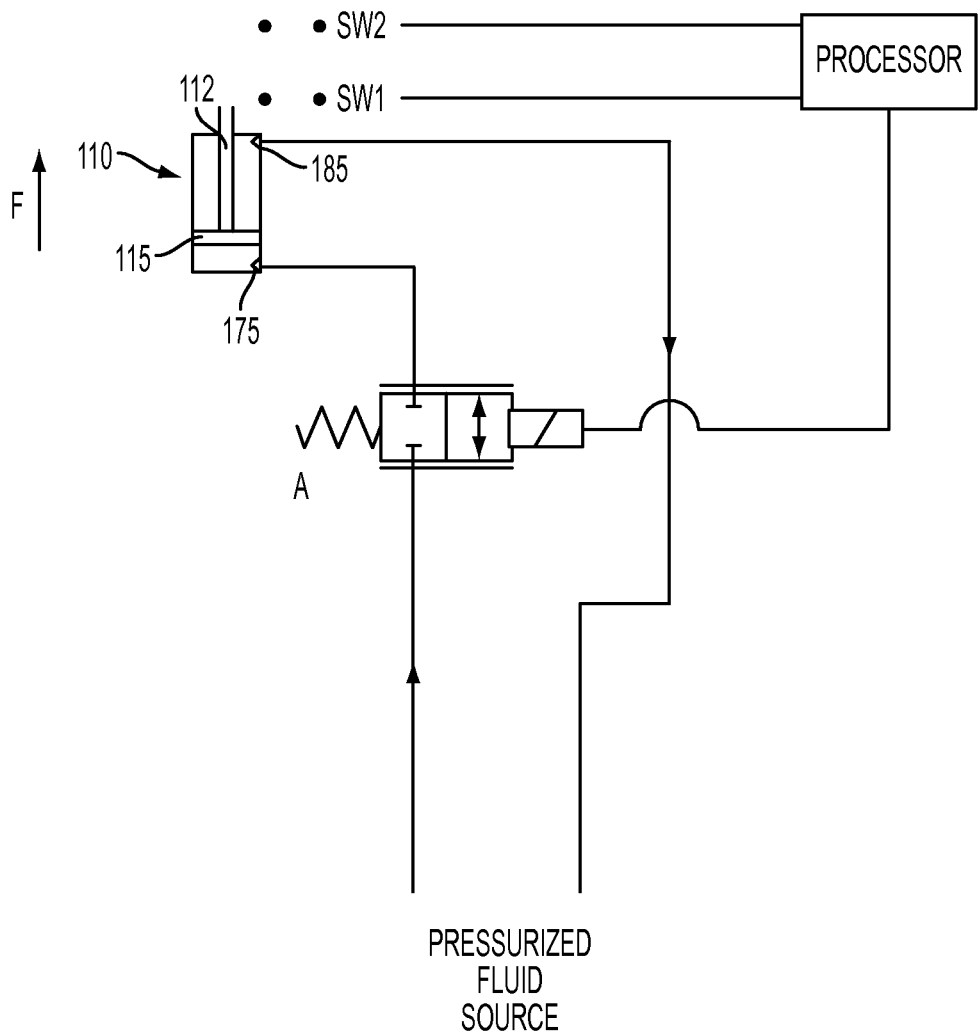
FIG. 2 depicts a first hydraulic state of a hydraulic circuit.

FIG. 2 depicts a hydraulic circuit in its first hydraulic state which is engaged by the operator of hydraulic circuit when the operator desires to open the tailgate or panel to which the hydraulic cylinder 110 is mechanically linked. Assuming an operator is operating tractor that is pulling a baler, the operator will actuate a remote on the tractor to initiate the process of raising the tailgate on the baler mechanically linked to the actuator 110 when, for instance, a bale in a bale chamber reaches a desired width or density (not depicted). The hydraulic cylinder 110 comprises a disc 115 and a rod 112 that raise or lower in response to pressurized fluid filling a volume in the cylinder. Pressurized fluid enters the disc-side of the hydraulic cylinder 110 through a first fluid opening 175 or the rod-side of the hydraulic cylinder 110 of the hydraulic cylinder 110 through a second fluid opening 185. By steadily allowing the flow of pressurized fluid to one side, the pressurized fluid will build pressure against one side of the disc 115 pushing the disc 115 and rod 112 in one direction and displacing any volume of pressurized fluid in contact with the opposite side of the disc 115. While pressurized fluid (commonly referred to as high pressure fluid) enters through the first fluid opening 175, pressurized fluid in the opposite end of the hydraulic cylinder 110 may exit the hydraulic cylinder 110 through the second fluid opening 185 (commonly referred to as low pressure fluid). In this way, the hydraulic circuit is a closed circuit in which pressurized fluid is circulating to and from the source of the pressurized fluid. The depicted hydraulic circuit comprises a first, second, third, and fourth hydraulic state, each of which dictate when and how quickly the panel, or, in this embodiment, the tailgate opens and closes. Each hydraulic state comprises a first and second length, wherein the first length of the hydraulic state is the path within which pressurized fluid flows from the source of pressurized fluid to the fluid stop valve or the hydraulic cylinder, and the second length of the hydraulic state is the path within which pressurized fluid returns from either the fluid stop valve A or the hydraulic cylinder to the source of the pressurized fluid.

FIG. 2 depicts a first hydraulic state engaged when the operator of the hydraulic circuit desires to raise a panel, such as a tailgate. The flow of pressurized fluid is indicated by the large arrowheads on the depicted circuit paths. Pressurized fluid from a tractor enters the first length of the first hydraulic path and flows freely through fluid stop valve A. The pressurized fluid flows freely to the first fluid opening 175 of the hydraulic cylinder 110 due to, in part, the fluid stop valve A remaining open and inactivated. In its inactivated state, the fluid stop valve A has a fully open orifice that allows free flow of high pressurized fluid into the cylinder through the first fluid opening 175. Low pressurized fluid in the second hydraulic path of the first hydraulic state flows unencumbered from the second fluid opening 185 of the hydraulic cylinder to the source of the pressurized fluid. The first hydraulic state allows a steady opening of the tailgate without a substantial change in tailgate acceleration or deceleration.

The steady and unobstructed flow of pressurized fluid into the hydraulic cylinder 110 through the first fluid opening 175 builds a volume of pressurized fluid against the disc-side of the hydraulic cylinder 110. Fluid in the rod-side of the hydraulic cylinder 110 becomes displaced by the rod 112 and disc 115 thereby exiting the hydraulic cylinder 110 through the second fluid opening 185. The first hydraulic path also comprises the return of pressurized fluid from the hydraulic cylinder 110 to the tractor in a second length of the first hydraulic path. The steady flow of pressurized fluid into the disc-side of the hydraulic cylinder 110 and out of the rod-side of the hydraulic cylinder 110 causes the extension of the actuator 110 and the quick opening of the tailgate (not depicted). The arrow denoted with an "F" indicates the direction of movement of the disc 115 and the rod 112 in the hydraulic cylinder 110 depicted in FIG. 2.

A baler controller measures the amount of time (T) it takes for the cylinder to open a first switch SW1 and close a second switch SW2. From this time the controller can determine how fast the tailgate is moving and how far the tailgate has moved. When the baler controller determines that the tailgate has reached a predetermined or preprogrammed distance from its fully closed position or a desired distance (in some embodiments, nearing the end of stroke) or that the tailgate is open sufficiently wide to eject the bale from the bale chamber, the second switch SW2 closes and the first switch SW1 opens thereby causing the fluid controller to begin to close the restrictive orifice of valve A. In some embodiments, the close of switch SW2 and the narrowing of fluid stop valve A indicates the transition from the first hydraulic state to the second hydraulic state.

Figure 3:
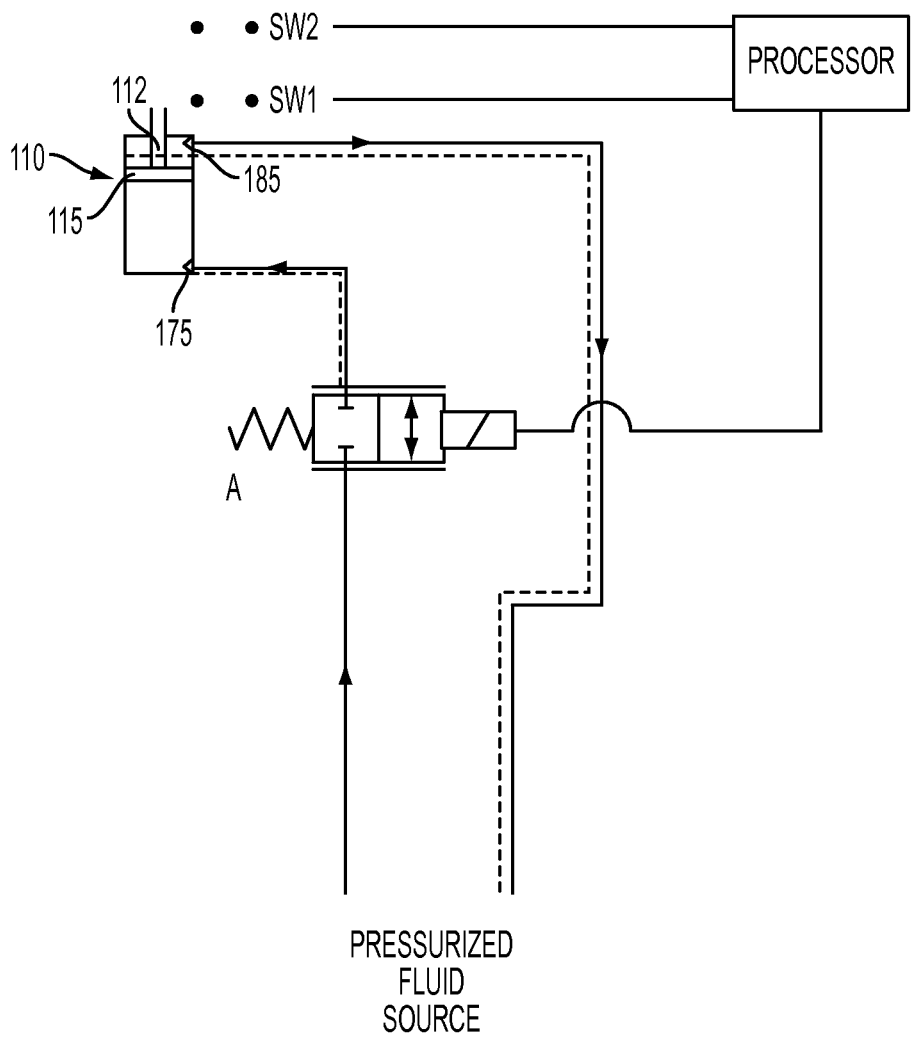
FIG. 3 depicts a second hydraulic state of a hydraulic circuit.

FIG. 3 depicts a second hydraulic state in which pressurized fluid from the source of the pressurized fluid flows through the stop valve A at a slower speed at least partially regulated by the width of the restrictive orifice activated by the controller. Once the valve closes at least partially either instantaneously or gradually to a predetermined position, the pressurized fluid in the hydraulic path slows considerably which causes the speed of the panel (or, in the case of a baler, the tailgate) to decelerate as it approaches its predetermined fully open position. The reduced amount of flow is depicted as a dashed line in FIG. 3. The momentum of the tailgate as well as the deceleration of the tailgate caused by the slower hydraulic fluid flow allow the tailgate to slowly open to its predetermined fully open position, rather than forcibly change direction or stop precipitously by detection and activation of controllers at the full extension of the at least one hydraulic cylinder. In some embodiments, the restrictive orifice may be adjusted by the operator to reduce the flow rate of the pressurized fluid in the hydraulic circuit to a flow rate lower than the flow rate of the pressurized fluid in the first hydraulic path. The operator may adjust the width or diameter of the restrictive orifice in the stop valve A to reach a flow rate in the hydraulic circuit that is sufficient to compensate for additional force necessary to raise the tailgate and/or float the tailgate open without forcibly stopping or forcibly changing the direction of the tailgate by reversing the flow of the pressurized fluid in the hydraulic circuit. In some embodiments, the operator may preprogram or mechanically engage a switch to transition from the first hydraulic state to the second hydraulic state at predetermined heights of the tailgate and/or predetermined slopes during operation to ensure that bale ejection is accomplished without forcibly opening or closing the tailgate. A second hydraulic path of the second hydraulic state as depicted in FIG. 3 shows free flow of low pressurized fluid from the second fluid opening 185 of the hydraulic cylinder 110 directly to the source of the pressurized fluid. The reduced rate of flow from the hydraulic cylinder correlates to how narrow the opening of the restrictive orifice of the stop valve A may be. Once the tailgate reaches the desired height and comes to a stop, the baling mechanism may be activated to eject a bale from the bale chamber through a bale outlet uncovered by the tailgate. After the bale has been ejected, an operator may manually reverse or preprogram automatic reversal of the flow direction of the pressurized fluid in the hydraulic circuit. If preprogrammed, a controller operably connected to one or more processors comprising a storage memory may execute one or more open or close commands to the stop valve A if ejection of the bale from a bale chamber is desirable under one or a combination of conditions disclosed herein. In some embodiments, the transition from the first hydraulic state to a second hydraulic states comprises a gradual adjustment of the orifice in the fluid stop valve. Gradual narrowing of the orifice in the at least one fluid stop valve to at least one predetermined diameter allows for gradual deceleration of the fluid in the fourth hydraulic state. In some embodiments, the transition from the third hydraulic state to a fourth hydraulic states comprises a gradual adjustment of the orifice in the fluid stop valve. Gradual narrowing of the orifice in the at least one fluid stop valve to at least one predetermined diameter allows for gradual deceleration of the fluid in the fourth hydraulic state.

Figure 4:
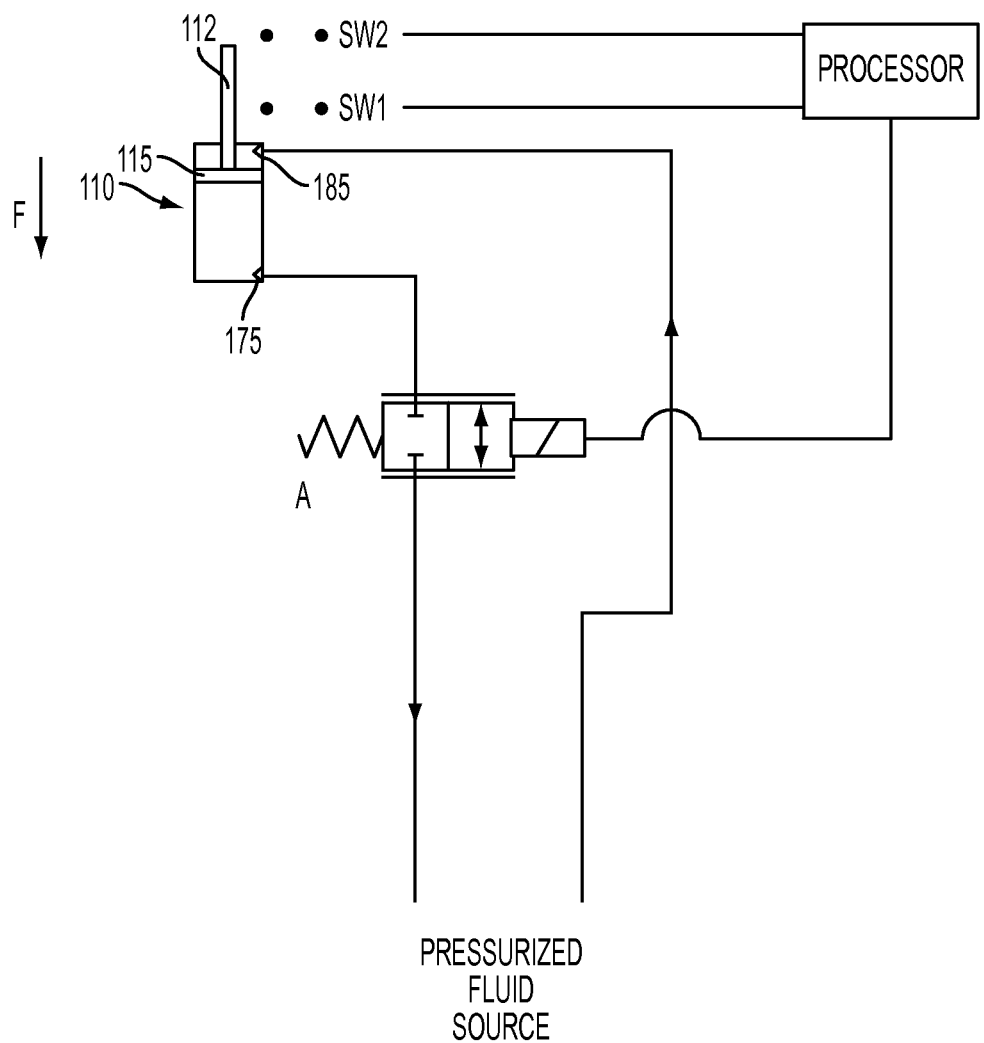
FIG. 4 depicts a third hydraulic state of a hydraulic circuit.

FIG. 4 depicts an embodiment in a third hydraulic state. The third hydraulic state includes a transition from the narrowed orifice from a closed or partially closed state to a fully open or open state as compared to the position of the orifice in the second hydraulic state. This change to the adjustable orifice depends on at least one or a combination of the following: (i) a predetermined amount of time has elapsed from initiation of the second hydraulic state; (ii) a position or change of direction of the panel or tailgate; (iii) a change in hydraulic pressure has occurred at the second fluid opening, indicating the operator is closing the tailgate; (iv) a serpentine arm of the baling mechanism motion has stopped or reversed direction; (v) position of the bale ramp has changed, indicating the tailgate can be closed; and (vi) the presence or absence of a bale in the baling mechanism. In any of these embodiments, the positions or speeds of the tailgate, serpentine arm, hydraulic pressure, the bale ramp or the bale may be detected by one or more sensors.

Once the orifice has adjusted instantaneously or gradually to its open position relative to its position in the second hydraulic state, the third hydraulic state includes hydraulic fluid flows from the source of pressurized fluid to the second fluid opening 185 of the hydraulic cylinder 110. This first length of the third hydraulic state represents a first hydraulic path of the third hydraulic state. As the volume of pressurized fluid builds on the rod-side of the cylinder 110, the disc-side of the cylinder 110 contracts and releases low pressure hydraulic fluid from the first fluid opening 175 of the hydraulic cylinder to the source of pressurized fluid in a second hydraulic path of the third hydraulic state. To steadily and efficiently close the tailgate operably connected to the hydraulic cylinder, constant flow of the pressurized fluid is achieved by opening the restrictive orifice of the stop valve A. The arrow labeled "F" indicates the direction of the movement of the rod 112 and the disc 115 in the hydraulic cylinder 110.

Figure 5:
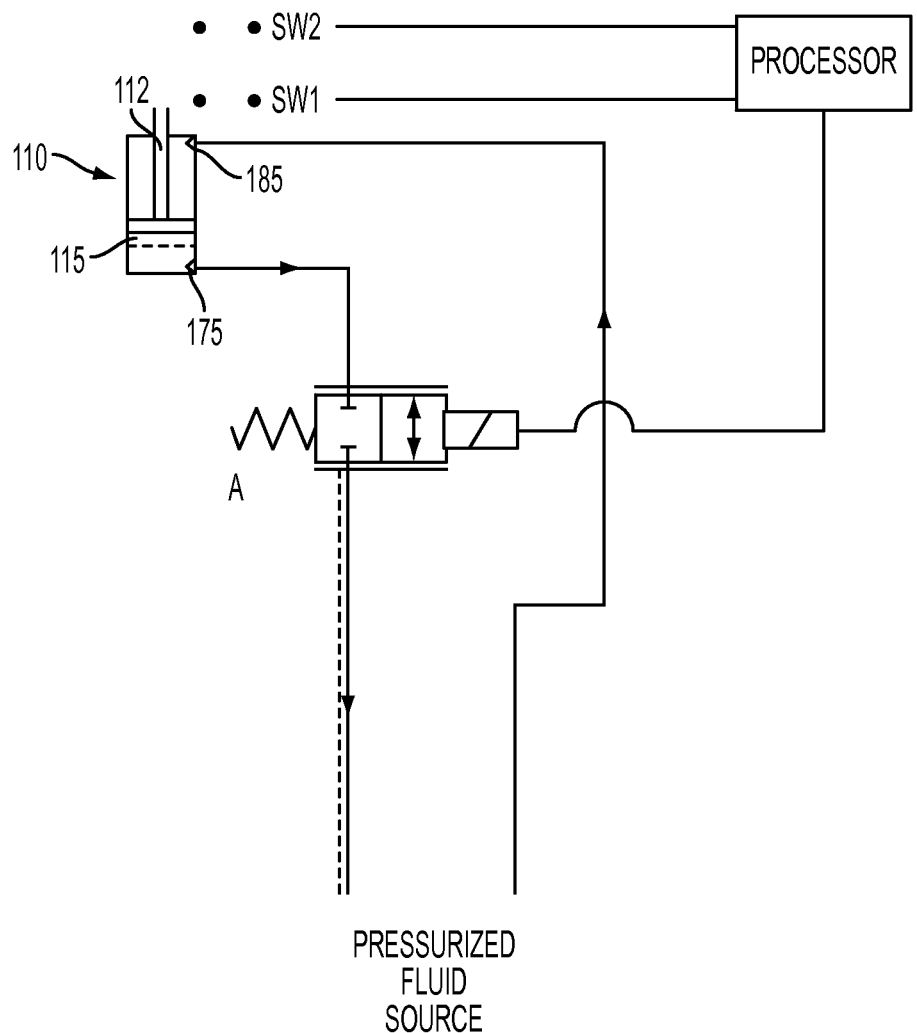
FIG. 5 depicts a fourth hydraulic state of a hydraulic circuit.

FIG. 5 depicts the fourth hydraulic state that comprises the deceleration of the panel or tailgate from an open position to a partially closed or fully closed position. If the operator wishes to fully close the tailgate without forcibly shutting the tailgate through continuous contraction of the hydraulic cylinder 110 at a constant rate, the operator may transition from the third hydraulic state to the fourth hydraulic state whereby the restrictive orifice of the stop value A is narrowed instantaneously or gradually to create a reduced rate of pressurized fluid flow from the stop valve A to the source of the pressurized fluid. A baler controller may measure the amount of the (T) it takes for the cylinder to open a first switch SW1 and close a second switch SW2 based upon at least partially by position of the tailgate while it closes. From this time, the controller can determine how fast the tailgate is moving downward and how far the tailgate has moved from its fully open or predetermined open position to a closed or partially closed position. When the baler controller determines that the tailgate has reached a predetermined and/or preprogrammed distance from its fully opened position (in some embodiments, nearing the end of the closed stroke) or that the tailgate is closed sufficiently to initiate bale growth in the bale chamber, the second switch SW2 closes and the first SW1 opens thereby causing the fluid controller to begin to close the restrictive orifice of stop valve A. In some embodiments, the closing of switch SW2 and the narrowing of fluid stop valve A indicates the transition from the third hydraulic state to the fourth hydraulic state. Reduced rate of the flow of the pressurized fluid in the fourth hydraulic path of the fourth hydraulic state causes deceleration of the tailgate prior to or immediately prior to the tailgate reaching its fully closed or desired partially closed position.

Figure 6:
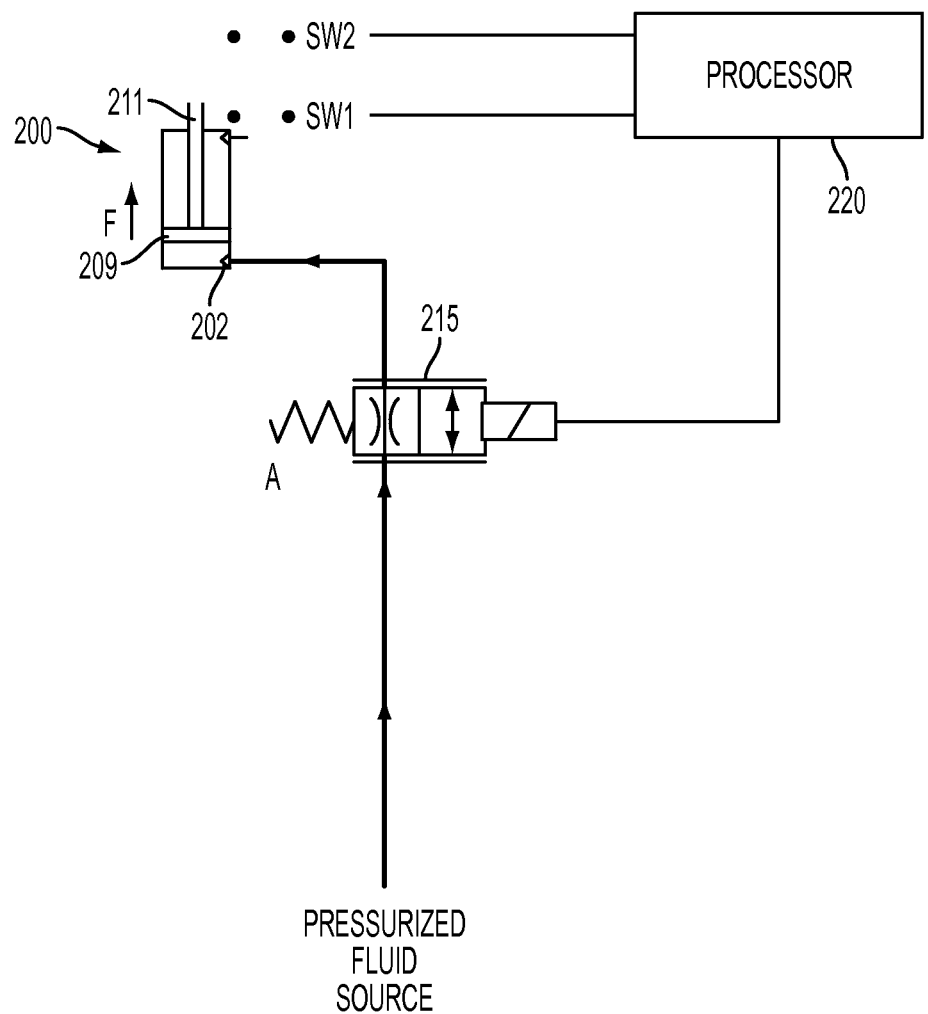
FIG. 6 depicts a first hydraulic state of a hydraulic circuit comprising a fluid stop valve with a restrictive orifice.

An alternative embodiment is depicted in FIGS. 6-9 in which the double-acting hydraulic cylinder depicted in FIGS. 2-5 is replaced with a single-acting hydraulic cylinder 200. The single-acting cylinder 200 comprises a restrictive orifice that allows slow (relative to an open stop valve A) in a de-energized state and, in an energized state, the stop flow valve A allows steady flow of pressurized fluid in the hydraulic circuit. The de-energized state of the fluid stop valve A can be controlled by a processor 220 operably connected to a first and second switch SW1, SW2. FIG. 6 depicts a first hydraulic state in which pressurized fluid flows freely from the source of the pressurized fluid to the fluid opening 202 of through an energized stop valve A and closed switch SW1. Pressurized fluid builds against the disc 209 linked to the rod 211 in the single-acting hydraulic cylinder 200 causing the cylinder to extend in the direction shown by arrow F. Once the disc 209 and rod 211 approach their fully extended position, SW2 becomes activated thereby de-energizing fluid stop valve A and transitioning the hydraulic circuit to a second hydraulic state.

Figure 7:
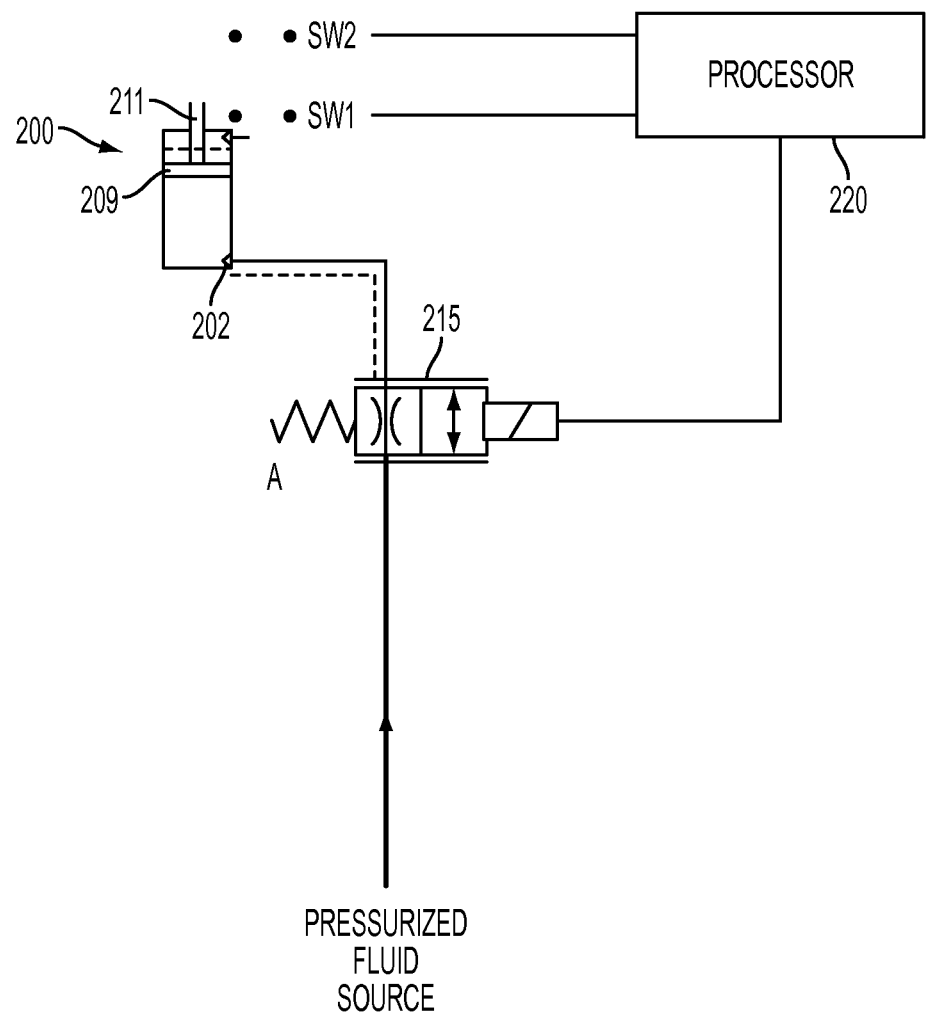
FIG. 7 depicts a second hydraulic state of a hydraulic circuit. comprising a fluid stop valve with a restrictive orifice

As described above when referencing the de-energized fluid stop valve A, pressurized fluid passes through a restrictive orifice (depicted by two oppositely facing concave lines in FIG. 7) in the fluid stop valve A in its de-energized state. FIG. 7 depicts a second hydraulic state in which the fluid entering the valve A passes through the restrictive orifice at a slower rate of flow than the rate of flow of the pressurized fluid when the fluid stop valve A is energized. For purposes of depicting the slower flow, dashed lines are added to the segment of the hydraulic path in which the pressurized fluid flows more slowly as compared to the flow of the fluid in the first hydraulic state. The restrictive orifice slows the rate of flow of pressurized fluid entering he single-acting hydraulic cylinder 200 at the fluid opening 202. A panel, such as a tailgate, that is operably connected to the hydraulic cylinder 200 will slowly open to a stop without forceful and/or abrupt movement. A dashed outline of the disc 209 in the cylinder 200 delineates the approximate position of the disc 209 when the cylinder 200 is in its fully extended state. After ejection of the bale is complete or when the operator chooses to close the panel, the flow of the pressurized fluid is reversed.

Figure 8:
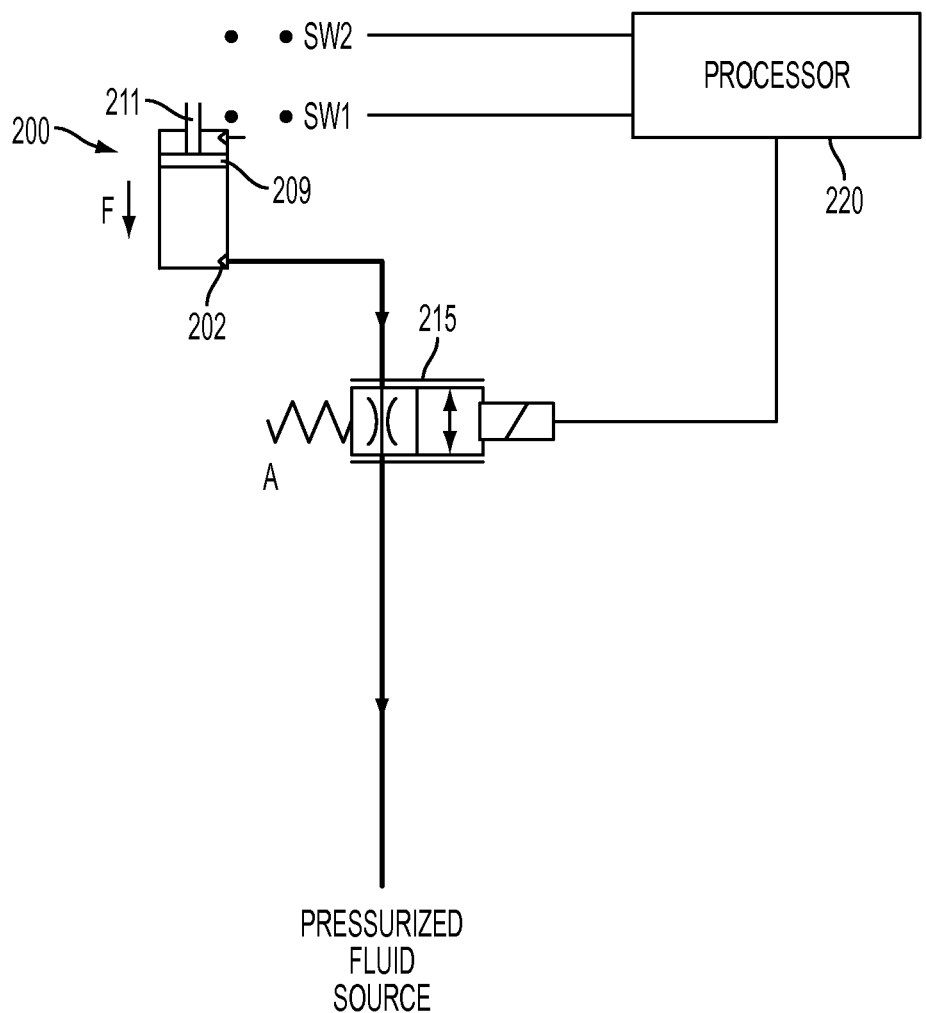
FIG. 8 depicts a third hydraulic state of a hydraulic circuit comprising a fluid stop valve with a restrictive orifice.

FIG. 8 depicts a third hydraulic state when the flow of pressurized fluid is reversed in the system when the operator chooses to close the panel mechanically linked to the cylinder 200 by energizing the fluid stop valve A. When the flow of pressurized fluid is reversed, gravity in the single-acting cylinder 200 assists the flow of pressurized fluid out of the fluid opening 202 and back through an open fluid stop valve A. The flow of pressurized fluid back to the source of the pressurized fluid is quick and steady in the direction depicted by the bolded arrowhead. A constant or substantially constant rate of closing the panel linked to the cylinder 200 is achieved. When the disc 209 and rod 211 nears a position of full contraction, an abrupt and/or forceful stop is avoided by de-energizing the fluid stop valve A and transitioning to the four hydraulic state depicted in FIG. 9.

Figure 9:
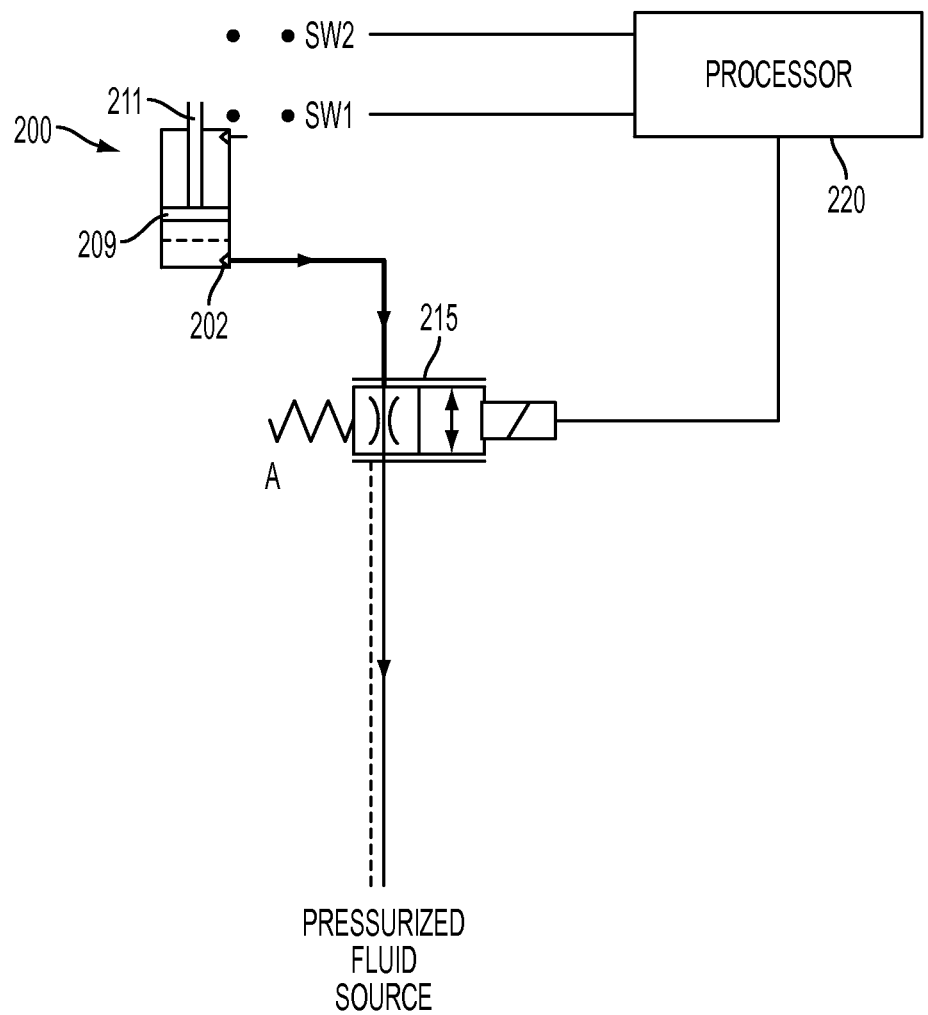
FIG. 9 depicts a fourth hydraulic state of a hydraulic circuit comprising a fluid stop valve with a restrictive orifice.

In FIG. 9, the restrictive orifice within the fluid stop valve A is active after energizing the fluid stop valve A. Instead of constant and/or substantially quick downward movement of the disc 209 and rod 211 in the cylinder 200 during the third hydraulic state, FIG. 9 depicts a fourth hydraulic state in which deceleration of the contraction of the cylinder 200 is achieved by the reducing the rate of flow in the hydraulic circuit when the restrictive fluid stop valve A is energized to form a restrictive orifice at its valve position. In FIG. 9, the switch SW1 is energized and the switch SW2 is de-energized which, in this configuration activates the restrictive orifice within the fluid stop valve A. Dotted lines next to the hydraulic circuit path in FIG. 9 represent the slower rate of flow of the pressurized fluid as compared to the rate of flow of the pressurized fluid when the circuit is in its first or third hydraulic states.

Figure 10:
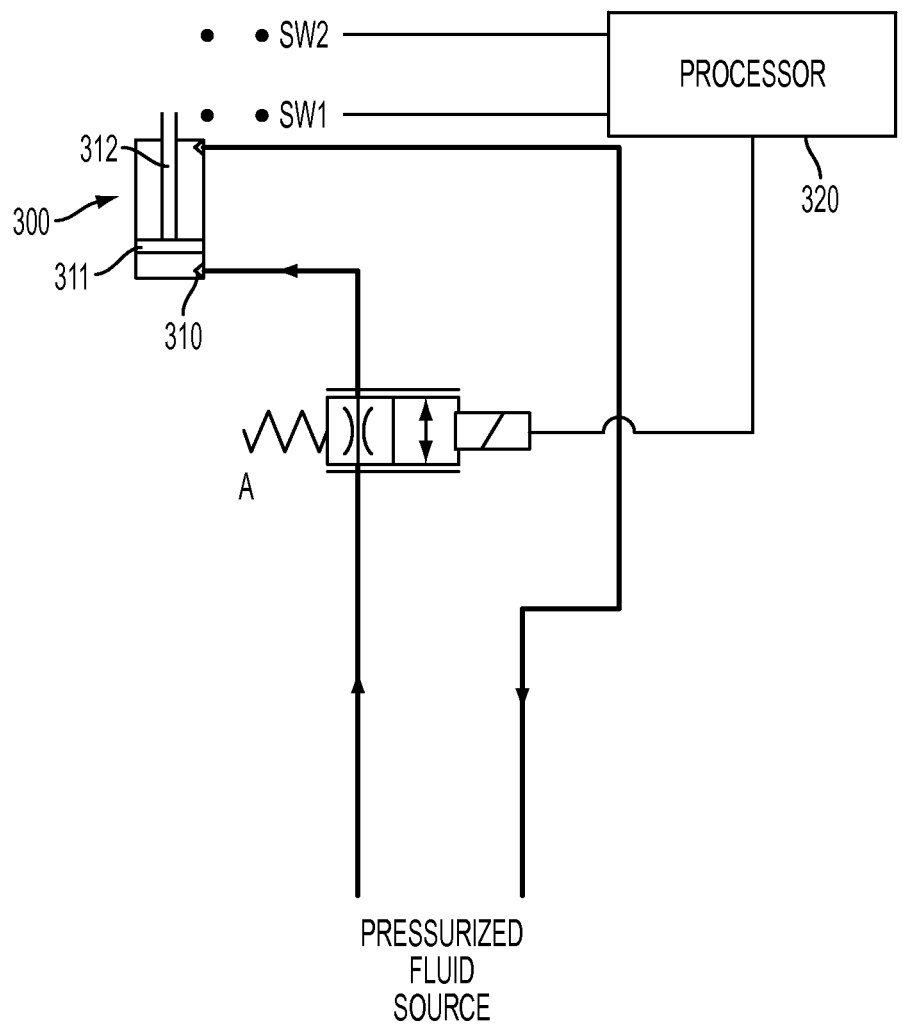
FIG. 10 depicts an alternative embodiment in which the hydraulic circuit comprises a double acting cylinder and a fluid stop valve with a restrictive orifice.

Another embodiment of the invention is depicted in FIG. 10 in which a fluid stop valve A comprises a restrictive orifice which becomes active after being energized by a signal from the processor 320. FIG. 10 depicts a first hydraulic state of this embodiment in which fluid flows from the source of the pressurized fluid through an open fluid stop valve A and then into a double-acting cylinder 300 through a first fluid opening 310. A volume of pressurized fluid builds in the bottom region of the cylinder 300 and displaces the disc 311 and rod 312 upward at a constant and relatively quick rate. FIG. 10 depicts a second hydraulic path in the first hydraulic state where the pressurized fluid exits a second fluid opening 315 and returns to the source of the pressurized fluid. The hydraulic circuit in the embodiment depicted in FIG. 10 also operates in a second, third, and fourth hydraulic state (not depicted). While not depicted, the fluid paths of each of the second, third, and fourth states are identical to the fluid paths in the FIGS. 3-5, except that the adjustable valve in FIGS. 2-5 is replaced by the activated restrictive orifice of FIG. 10 (shown as adjacent, outwardly facing concave curves within the fluid stop valve A).

In some embodiments, the hydraulic circuit, agricultural harvesters, systems, and baling mechanisms that include one, two or any combination of hydraulic states described herein do not comprise a cushion hydraulic cylinder or any hydraulic cylinder that has adjustable fluid opening for pressurized fluid. In some embodiments, the hydraulic circuit of the claimed invention does not involve more than one fluid stop valve with an electrically controlled restrictive orifice. In some embodiments, the hydraulic circuit of the claimed invention consists of only one fluid stop valve with an electrically controlled restrictive orifice that, when engaged as a component of one or more hydraulic paths disclosed herein, causes the instantaneous or gradual deceleration or stoppage of panel movement before or immediately before fully raising or fully closing the panel and allows a sufficient amount of back pressure in the hydraulic circuit at one or more fluid openings of a hydraulic cylinder to allow reduced speed and/or stoppage of the panel before or immediately before reaching a fully closed, fully raised position, or predetermined distance from its position prior to engagement of the stop valve.

One of ordinary skill in the art would appreciate that embodiments also include agricultural harvesters, systems, and baling mechanisms that include circuits comprising only the first hydraulic path, only the second hydraulic path, only the third hydraulic path, only the fourth hydraulic path, or any combinations thereof. One of ordinary skill in the art would appreciate that embodiments also include agricultural harvesters, systems, and/or baling mechanisms that include fluid circuits that comprise only the first hydraulic state, only the second hydraulic state, only the third hydraulic state, only the fourth hydraulic state, or any combinations thereof.

For instance, in some embodiments, the agricultural harvester or system disclosed herein comprises only the third and fourth hydraulic states, each state comprising a first and second hydraulic path of pressurized fluid disclosed herein. In some embodiments, the agricultural harvester or system disclosed herein comprises only the first and second hydraulic states, each state comprising a first and second hydraulic path of pressurized fluid disclosed herein. In either case, the invention also relates to methods of opening or closing a tailgate of a baling mechanism whereby the step of opening or closing the tailgate comprises a first and second and/or a third and fourth hydraulic states, each hydraulic state comprising a first and second hydraulic path. In some embodiments, the invention relates to a method of opening a tailgate of a baler or baling mechanism, the method comprising operating the tailgate in a first hydraulic state comprising the first and second hydraulic paths disclosed herein, and operating the tailgate in a second hydraulic state comprising its first and second hydraulic paths disclosed herein. In some embodiments, the invention relates to a method of closing a tailgate of a baler or baling mechanism, the method comprising operating the tailgate in a hydraulic state identical or equivalent to the third hydraulic state disclosed herein and subsequently operating the tailgate in a hydraulic state identical or equivalent to the fourth hydraulic state disclosed herein. In some embodiments, the method of opening and/or closing a tailgate comprises activating a fluid circuit comprising one or more stop valves with an adjustable restrictive orifice in sequence such that when pressurized fluid the restrictive orifice is open or partially open, the tailgate raises or lowers at a relatively constant rate; and when pressurized fluid flows through the at least one restrictive orifice in a second hydraulic state, gradual deceleration or stoppage of the flow of the pressurized fluid causes the opening and/or closing of the tailgate to steadily decrease and, optionally, stop or drift slowly upward or downward. In some embodiments, the hydraulic circuit, system, or agricultural harvester disclosed herein does not comprise positional sensors or a check valve that forcibly accelerate or decelerate the movement of the tailgate upon transition from one hydraulic state to another hydraulic state. In some embodiments, the hydraulic circuit comprises either a single-acting hydraulic cylinder or a double-acting hydraulic cylinder. In some embodiments, the hydraulic circuit does not comprise a single-acting cylinder. In some embodiments, the fluid stop valve does not comprise a restrictive orifice.

Embodiments described in the U.S. patent application entitled, FLUID CIRCUIT FOR BALE EJECTION, having Ser. No. 14/089,556, filed on Nov. 25, 2013, invented by Kevin Smith are part of this disclosure, and the application is incorporated by reference in its entirety.

Although the invention has been described with reference to exemplary embodiments, it is not limited thereto. Those skilled in the art will appreciate that numerous changes and modifications may be made to the disclosed embodiments of the invention and that such changes and modifications may be made without departing from the true spirit of the invention. It is therefore intended that the appended claims cover be construed to all such equivalent variations as fall within the true spirit and scope of the invention.

What is claimed is:

1. An agricultural harvester comprising:
   a baling chamber comprising a bale outlet and a tailgate at a rear section of the baling chamber, the tailgate movable between a closed and one or more open positions and obstructing the bale outlet in its closed position;
   at least one actuator mechanically linked to the tailgate, the at least one actuator capable of moving the tailgate between the closed and one or more open positions and having at least a first fluid opening on one end of the actuator, wherein the first fluid opening feeds and/or returns pressurized fluid into a hydraulic circuit, the hydraulic circuit comprising:
      a source of pressurized fluid in fluid communication with at least the first opening for supplying fluid to and returning fluid from the actuator in the hydraulic circuit;
      at least one fluid stop valve in fluid communication with the hydraulic circuit; and
      at least one fluid controller that controls the flow of pressurized fluid through the fluid stop valve from the source of pressurized fluid or from the at least one actuator;
   wherein the at least one actuator is configured to move the tailgate from a closed position to one or more open positions in a first and a second hydraulic state; whereby, in the first hydraulic state, the stop valve is open allowing pressurized fluid from the source of pressurized fluid to enter the first fluid opening; and, whereby, in the second hydraulic state, a restrictive orifice in the fluid stop valve is at least partially narrowed or closed thereby reducing the rate of flow of pressurized fluid from the source of the pressurized fluid through the at least one fluid stop valve and substantially reducing and/or stopping movement of the at least one actuator.

2. The agricultural harvester of claim 1, wherein the at least one actuator comprises:
   the first fluid opening on one end of the actuator,
   a second fluid opening on the opposite end of the actuator, wherein the first and second fluid openings feed and/or return pressurized fluid into the hydraulic circuit; the hydraulic circuit comprising:
   a source of pressurized fluid in fluid communication with the first and second openings for supplying fluid to and returning fluid from the actuator in the hydraulic circuit;
   at least one fluid stop valve in fluid communication with the hydraulic circuit; and
   at least one fluid controller that controls the flow of pressurized fluid through the fluid stop valve from the source of pressurized fluid or from the at least one actuator;
   wherein the tailgate moves from a closed position to one or more open positions in a first and a second hydraulic state; whereby, in the first hydraulic state, the stop valve is open allowing pressurized fluid from the source of pressurized fluid to enter the first fluid opening; and, simultaneously, pressurized fluid returns from the at least one actuator through the second fluid opening to the source of the pressurized fluid; and whereby, in the second hydraulic state, a restrictive orifice in the fluid stop valve is at least partially narrowed or closed thereby reducing the rate of flow of pressurized fluid from the source of the pressurized fluid through the at least one fluid stop valve and substantially reducing and/or stopping movement of the at least one actuator.

3. The agricultural harvester of claim 1, wherein the at least one actuator further comprises a first switch and a second switch, the first switch and second switch each having a first state and a second state and being in operable connection to the fluid controller, wherein the tailgate moves from the first to the second hydraulic state upon activation of the first switch from its first to second state.

4. The agricultural harvester of claim 3 further comprising a controller that measures a time period for the first switch change from a first state to a second state and a time period for the second tailgate switch to change from a first state to a second state, wherein the time period for the first tailgate switch to change from a first state to a second state is dependent upon at least one or a combination of: (i) a diameter or density of a bale growing in the bale chamber; (ii) a presence or absence of a bale in the bale chamber; (iii) a predetermined position of the tailgate relative to its closed position; (iv) a predetermined position of a serpentine arm mechanically linked to the agricultural harvester and capable of upward movement upon initiating ejection of the bale from the bale chamber; and (v) a predetermined position of a bale ramp mechanically linked to the agricultural harvester and capable of supporting a bale ejected from the bale chamber.

5. The agricultural harvester of claim 4, wherein the at least one fluid controller is programmed to adjust the rate of flow of the pressurized fluid through the fluid stop valve by adjusting the position of a restrictive orifice, and wherein the time period for the first tailgate switch to change from a first state to a second state is dependent upon at least a predetermined position of the tailgate.

6. The agricultural harvester of claim 4, wherein the at least one fluid controller is a solenoid programmed to be energized and at least partially close the restrictive orifice in the fluid stop valve relative to its position in the first hydraulic state thereby reducing the rate of flow of the pressurized fluid to the at least one actuator.

7. The agricultural harvester of claim 4, wherein the at least one fluid controller is a solenoid programmed to be energized and at least partially close the restrictive orifice in the fluid stop valve relative to its position in the first hydraulic state thereby reducing the rate of flow of the pressurized fluid to the at least one actuator, wherein the solenoid is energized at least partially based upon the predetermined position of the bale ramp.

8. The agricultural harvester of claim 4, wherein the at least one fluid controller is a solenoid programmed to be energized and at least partially close the restrictive orifice in the fluid stop valve relative to its position in the first hydraulic state thereby reducing the rate of flow of the pressurized fluid to the at least one actuator, wherein the solenoid is energized at least partially based upon at least a predetermined position of the tailgate.

9. The agricultural harvester of claim 4, wherein the at least one fluid controller is a solenoid programmed to be energized and at least partially close the restrictive orifice in the fluid stop valve relative to its position in the first hydraulic state thereby reducing the rate of flow of the pressurized fluid to the at least one actuator, wherein the solenoid is energized at least partially based upon a predetermined position of a serpentine arm mechanically linked to the agricultural harvester.

10. The agricultural harvester of claim 3, wherein the tailgate moves from an opened position to a closed position in a third and a fourth hydraulic state; whereby, in the third hydraulic state, the flow of the pressurized fluid is reversed in the hydraulic circuit such that fluid from the source of pressurized fluid flows directly to the second fluid opening of the at least one actuator, and, simultaneously, pressurized fluid returns from the at least one actuator through the first fluid opening and through the open stop valve allowing free flow of pressurized fluid from the at least one actuator to the source of the pressurized fluid; and whereby, in the fourth hydraulic state, the fluid stop valve is narrowed either instantaneously or gradually, thereby reducing the flow of pressurized fluid from the at least one fluid stop valve into the source of pressurized fluid relative to flow of the pressurized fluid in the third hydraulic state and thereby substantially slowing and/or stopping the movement of the tailgate as it approaches its closed position.

11. The agricultural harvester of claim 1, wherein the hydraulic circuit comprises a single fluid stop valve.

12. The agricultural harvester of claim 10, wherein the tailgate moves from the third to the fourth hydraulic state based upon one or a combination of: (i) activation of the second switch from its first to second state; or (ii) one or more movements and/or one or more positions of one or more serpentine arms in one or more baling mechanisms.

13. The agricultural harvester of claim 1, further comprising at least one activation device in operable connection to the fluid controller and manually activatable to commence movement of the tailgate from the one or more open positions and/or from the closed position.

14. The agricultural harvester of claim 3, wherein the at least one fluid controller is a solenoid.

15. The agricultural harvester of claim 1, wherein the at least one fluid controller is a mechanical controller.

16. The agricultural harvester of claim 14, wherein the solenoid is programmed to be energized based upon the activation of one or a combination of: (i) the first switch from its first to second state; or (ii) the second switch from its first to second state.

17. The agricultural harvester of claim 14 further comprising a controller that measures a time period for the second switch change from a first state to a second state and a time period for the second tailgate switch to change from a first state to a second state, wherein the time period for the second tailgate switch to change from a first state to a second state is dependent upon at least one or a combination of: (i) a diameter or density of a bale growing in the bale chamber; (ii) a presence or absence of a bale in the bale chamber; (iii) a predetermined position of the tailgate relative to its open position; (iv) a predetermined position of a serpentine arm mechanically linked to the agricultural harvester and capable of upward movement upon initiating ejection of the bale from the bale chamber; and (v) a predetermined position of a bale ramp mechanically linked to the agricultural harvester and capable of supporting a bale ejected from the bale chamber.

18. The agricultural harvester of claim 1, wherein the agricultural harvester is chosen from a round baler cotton harvester, or combine comprising a baling mechanism.

* * * * *